US 8,428,993 B2

(12) United States Patent
Lee

(10) Patent No.: US 8,428,993 B2
(45) Date of Patent: Apr. 23, 2013

(54) METHOD AND APPARATUS FOR RISK IDENTIFICATION AND MITIGATION IN SHIFT WORK FATIGUE

(75) Inventor: Lynn Lee, Edgewater, MD (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 43 days.

(21) Appl. No.: 13/317,038

(22) Filed: Sep. 29, 2011

(65) Prior Publication Data
US 2012/0029971 A1 Feb. 2, 2012

Related U.S. Application Data

(63) Continuation-in-part of application No. 12/806,259, filed on Jul. 30, 2010.

(60) Provisional application No. 61/572,678, filed on Jul. 11, 2011.

(51) Int. Cl.
*G06Q 10/00* (2006.01)
(52) U.S. Cl.
USPC .............. 705/7.13; 705/7.15; 705/7.18
(58) Field of Classification Search ......... 705/7.11–7.42
See application file for complete search history.

(56) References Cited

U.S. PATENT DOCUMENTS

| | | | | |
|---|---|---|---|---|
| 7,766,827 | B2* | 8/2010 | Balkin et al. | 600/300 |
| 8,204,636 | B2* | 6/2012 | Christophe et al. | 701/14 |
| 2003/0018242 | A1* | 1/2003 | Hursh et al. | 600/300 |
| 2005/0033122 | A1* | 2/2005 | Balkin et al. | 600/300 |
| 2006/0142646 | A1* | 6/2006 | Hursh et al. | 600/300 |
| 2006/0200008 | A1* | 9/2006 | Moore-Ede | 600/300 |
| 2007/0293731 | A1* | 12/2007 | Downs et al. | 600/300 |
| 2009/0132332 | A1* | 5/2009 | Belenky et al. | 705/9 |
| 2009/0234719 | A1* | 9/2009 | Dvoredsky | 705/11 |

* cited by examiner

*Primary Examiner* — Lynda Jasmin
*Assistant Examiner* — Sujak Koneru
(74) *Attorney, Agent, or Firm* — Joseph A. Mancini

(57) ABSTRACT

Method and apparatus for shift work scheduling based upon an optimization of analyzing and managing fatigue primarily in but not limited to aviation occupations. The invention matches workers to shifts in a manner that minimizes fatigue while on shift and maximizes shift worker effectiveness. The invention is adaptable to other occupations where assuring shift work crew rest is critical. Graphical user interfaces (GUIs) allow for the insertion of sleep into crew shift work schedules. Alternative sleep models are used for different modes of sleep. The invention produces as an output an optimized shift work/sleep schedules with an associated effectiveness determination.

31 Claims, 8 Drawing Sheets

METHOD AND APPARATUS FOR RISK IDENTIFICATION AND MITIGATION IN SHIFT WORK FATIGUE

PRIORITY CLAIM UNDER 35 U.S.C. §119(e)

This patent application claims the priority benefit of the filing date of a provisional application, Ser. No. 61/572,678, filed in the United States Patent and Trademark Office on Jul. 11, 2011.

RELATED U.S. APPLICATION DATA

This patent application is a continuation-in-part of U.S. patent application Ser. No. 12/806,259 filed on Jul. 30, 2010 and is incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

Fatigue has been implicated in 234 Air Force Class A mishaps, 27 of which have fatigue as a causal factor. As the Air National Guard continues to do more with less, it is vital to address the issue of fatigue in aviation operations. Sustained night-time combat operations must take fatigue into account—a single night without sleep with today's sophisticated aircraft can result in the loss of enough higher cognitive function to be fatal.

Between 1974 and 1992, 25% of the Air Force's night tactical fighter Class A accidents were attributed to fatigue. Over 12% of the Navy's total Class A accidents between 1977 and 1990 were thought to be the result of aircrew fatigue. Some reports have put the annual cost of fatigue-related Air Force mishaps as high as $45M, in addition to loss of lives. Note the crash of Korean Air flight 801 in which 228 people died; the near crash of China Airlines flight 006 in which two people were severely injured and other passengers were traumatized; or the accident involving American Airlines 1420 in which 11 people died. In each of these cases, crew fatigue from long duty periods and/or circadian factors have been implicated. (AFRL 2003-0059) Fatigue has been implicated in the Three Mile Island accident, Exxon Valdez environmental spill, and Chernobyl nuclear plant disaster.

NASA's Michael Mann, on the August 1999 Pilot Fatigue hearing to the Aviation Subcommitee, United States House of Representatives, testified that "... pilot fatigue is a significant safety issue in aviation. Rather than simply being a mental state that can be willed away or overcome through motivation or discipline, fatigue is rooted in physiological mechanisms related to sleep, sleep loss, and circadian rhythms." The FAA has reported that 21% of the error reports in NASA's confidential Aviation Safety Reporting System reference fatigue as a direct or indirect factor.

Fatigue drives breakdowns in crew resource management, shortens attention spans, increases susceptibility to spatial disorientation, and causes deadly microsleep events in crews on final approach and landing. Loss of performance due to sleep deprivation follows extremely closely with loss of performance from blood alcohol content; 24 hours wakefulness approximates to 0.10 BAC, a level considered legally drunk in most states. Yet our crews routinely take off in the evening and head across the Atlantic, landing a complex, multi-million dollar aircraft after being up all night.

A significant step in fatigue management is the introduction of computer-based tools which intend to predict, for example, human aviator performance. These automated tools employ human sleep models and their relationship to cognitive performance. To date, however, such tools' interfaces are difficult to use, time consuming, and do not address specific concerns for different airframes and mission profiles, and ultimately, are only as good as the sleep models employed.

The original implementation of prior art fatigue calculation methods was based on the Warfighter Fatigue Model paper written by Dr. Steven Hursh et al. The paper describes the Sleep, Activity, Fatigue, and Task Effectiveness (SAFTE) model. This can be thought of as a mathematical simulation based on a rising and falling reservoir. When an individual is awake, the reservoir slowly depletes, and when the individual is asleep, the reservoir level rises. In conjunction with this process, biological circadian rhythms are taken into account along with jet lag to determine an individual's effectiveness at any given time. However, the prior art SAFTE model by itself did not provide or consider any methods for automatically adding sleep to work schedule, it did not provide a method for introducing multiple sleep models representative of the different possible modes of sleep, nor did it provide a method for introducing and analyzing the influence of secondary factors such as stimulants, sleep inertia, etc on crew effectiveness.

Another prior art fatigue monitoring system called FAST did not provide any means for accounting the effects of jet lag, time zone shifts, or many other factors today deemed highly relevant.

There exists a great and urgent need for proactive, rather than reactive approaches to aircrew shift fatigue monitoring, allowing the military flight planner the flexibility to not only automatically factor the benefits of the additions of sleep into a shift work schedule so as to optimize worker effectiveness, but also to account for the effects of various sleep modes and other effects associated with travel across multiple time zones and the resultant performance when planning flying operations.

OBJECTS AND SUMMARY OF THE INVENTION

One objective of this present invention is to provide a method and apparatus identifying and mitigating risk due to shift work fatigue by analyzing and modeling shift worker fatigue and effectiveness.

Another objective of this effort is to provide a method and apparatus for adding sleep periods to a crew work schedule.

Yet another object of the present invention is to provide a method and apparatus for modeling various sleep modes.

Still another object of the present invention is to provide a method and apparatus for removing the discontinuities that result from fragmented sleep periods.

Still yet another object of the present invention is to provide a method and apparatus for incorporating the influence of secondary factors such as the use of stimulants ("go pills") and sleep inertia on effectiveness.

Yet another object of the present invention is to provide a method and apparatus that displays a work/sleep schedule indicating crew effectiveness and alerts where effectiveness levels are critically low.

Still yet another object of the present invention is to optimize shift work scheduling based upon an analysis of shift worker fatigue and shift work requirements.

Briefly stated, the present invention provides a method and apparatus for shift work scheduling based upon an optimization of analyzing and managing fatigue primarily in but not limited to aviation occupations. The invention matches workers to shifts in a manner that minimizes fatigue while on shift and maximizes shift worker effectiveness. The invention is adaptable to other occupations where assuring shift work crew rest is critical. Graphical user interfaces (GUIs) allow for the insertion of sleep into crew shift work schedules. Alternative sleep models are used for different modes of sleep. The invention produces as an output an optimized shift work/sleep schedules with an associated effectiveness determination.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention is a method and apparatus for mitigating risk associated with shift work fatigue and its features include the automatic insertion of sleep into a shift work schedule, placing workers into shifts to minimize fatigue and maximize worker effectiveness, and more. While the primary motivation for the present invention is aircrew effectiveness, nothing in the present invention limits its application thereto. It is within the scope and spirit of the present invention and within the means of one skilled in the relevant art to extend the teachings of the present invention to other occupational fields.

Several mathematical methods for fatigue management have been developed over the years taking one of two approaches. The first is a One-Step process where the work schedule is combined with the sleep schedule and the fatigue results are determined. The second is the Two-Step process where sleep/work timings are inferred based on the parametric performance in the schedule. For example, RoboSleep, a prior art method, works using the One-Step process. Research has shown the value in the Two-Step process, however, it is seldom accurate beyond the scope of a specific occupational study set (ie, locomotive engineers). With regard to the objectives of the Air National Guard's fatigue management systems, it is necessary to have a multi-occupational method that fits not only transport pilots, but also maintenance workers, submarine crew, air traffic controllers, etc.

The present invention is therefore designed to accommodate the need for several to classes of individuals. It is a learning method based on a database of N indirect parameters and several direct parameters. The method works by collecting an infinite amount of schedule data and associated information with that data. With that information, a best fit sleep model can be derived and inserted into an empty work schedule.

The indirect parameters are based primarily on social cues and can include various degrees of information from age and gender to sleeping aids and stimulants. Direct parameters are those that deal with the schedule itself such as effectiveness and circadian value. Because of the use of direct parameters, the present invention falls under the Two-Step paradigm.

One embodiment of the present invention requires a central server database and an active internet connection.

Figure 1:
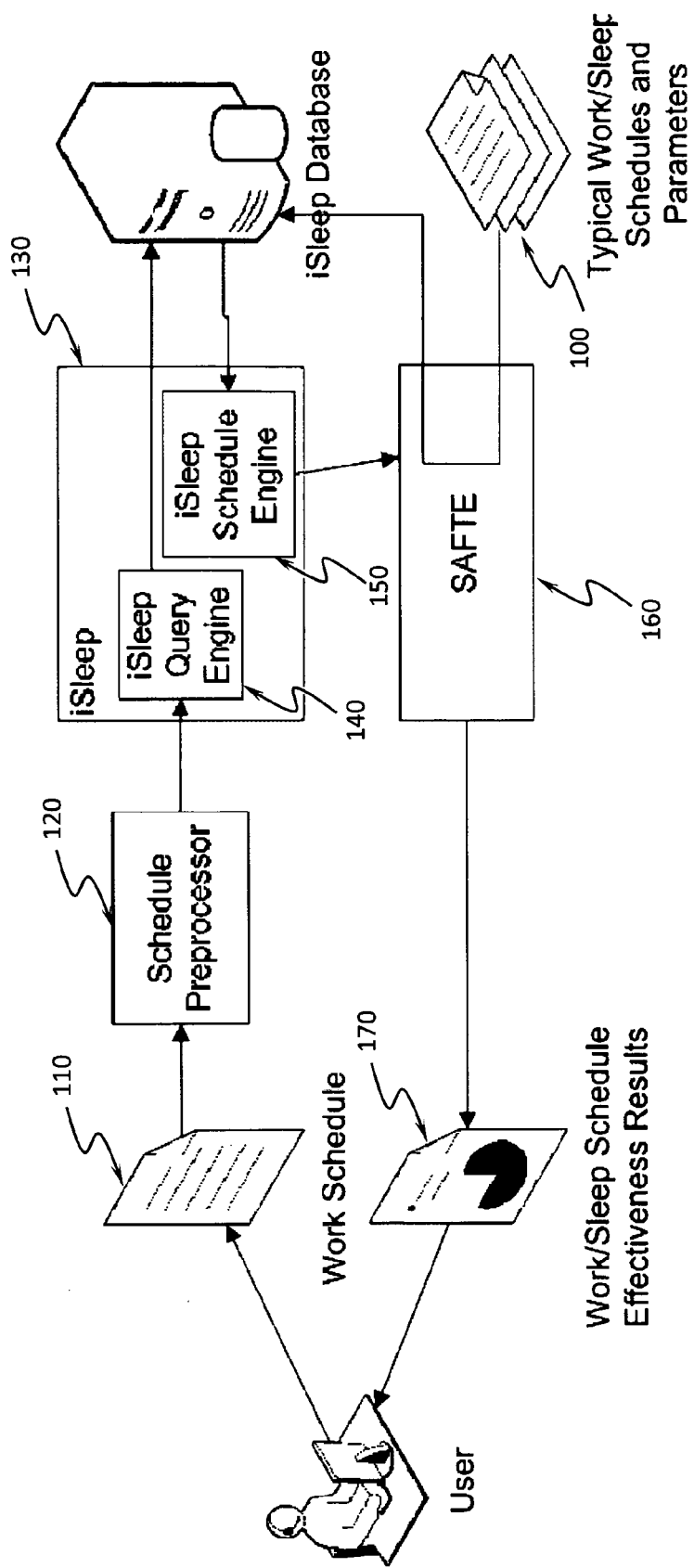
FIG. 1 depicts the architecture of the present invention.
Figure 7:
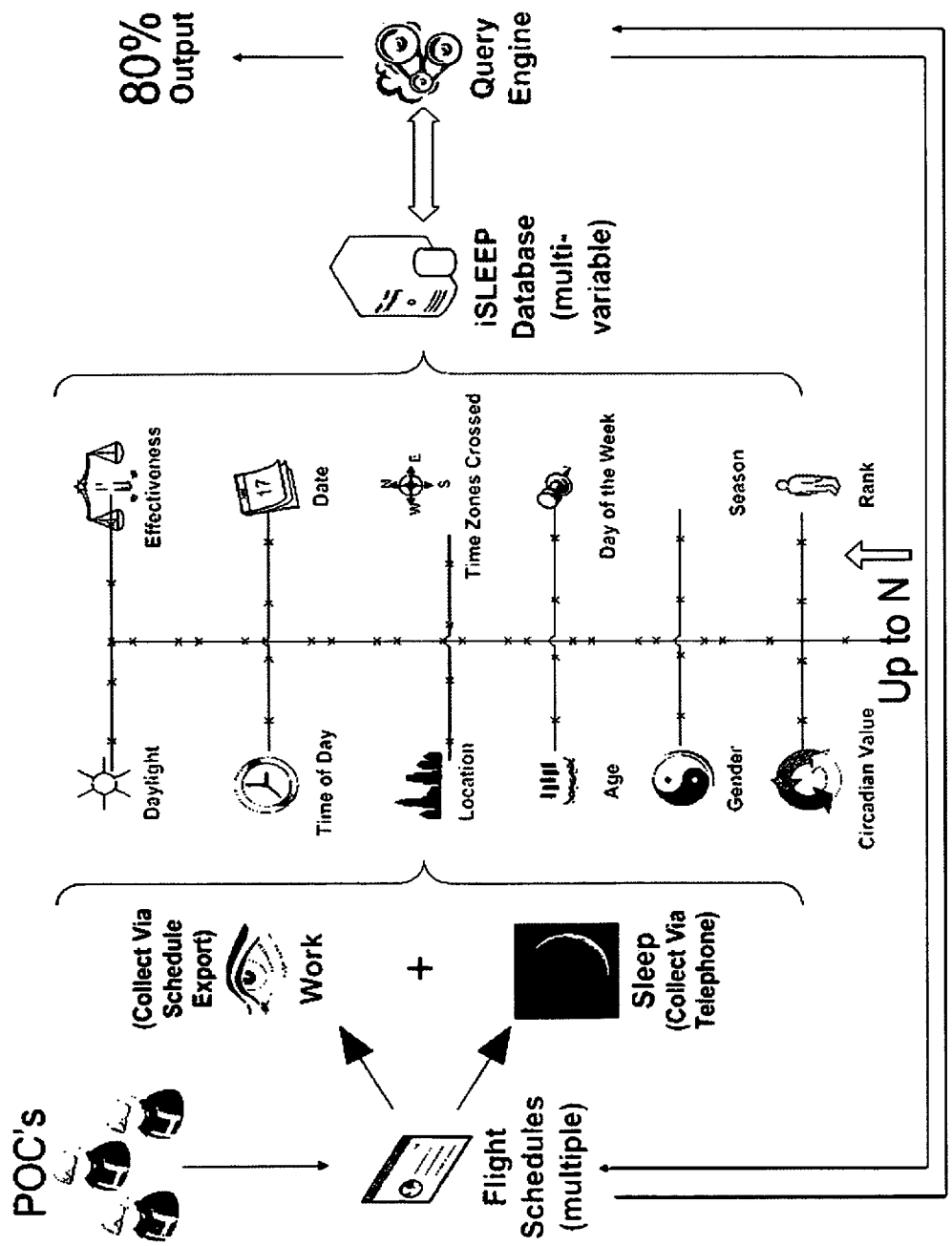
FIG. 7 depicts the sources from which the present invention collects data for the sleep database.

An important aspect of the present invention is the population of the database with existing schedule data. Referring to FIG. 1, these schedules 100 already contain both work and sleep information. That data is collected from as many sources as possible and inserted manually into the database (see FIG. 7). Before insertion, it is run through the SAFTE model 160 to obtain the values of the direct parameters. It is the sleep information from these already existing schedules that is used for the iSleep engine 130 of the present invention.

Still referring to FIG. 1, a high level depiction of the present invention, to build complete work/sleep schedule, a work-only schedule 110 is first created by the user in any number of user interfaces. That work schedule is submitted to a schedule preprocessor 120 which determines three direct parameters of the schedule: circadian value, daylight, and geographic location. That is then sent to the iSleep engine 130 and is broken down by work segments. Each work segment is sent through the query engine 140 for determining the closest match to similar work segments. Sleep times are combined using a weighted average for insertion to the schedule engine 150. The SAFTE model 160 is run for that portion of the schedule until the next work segment where the process repeats until the schedule is completed 170. The schedule output will end on a sleep segment.

Figure 8:
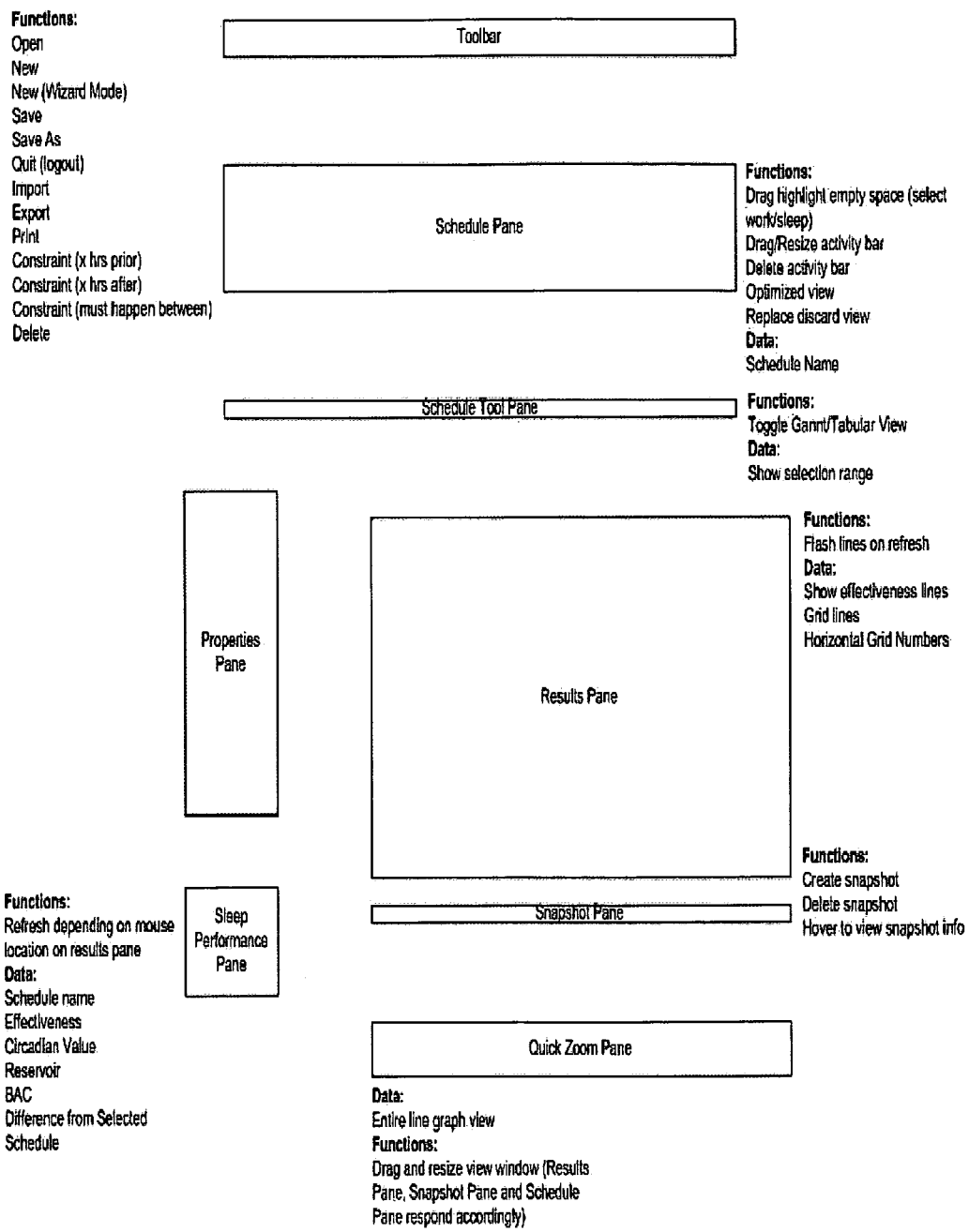
FIG. 8 depicts a functional view of the user interface of the present invention showing activity, schedule and results panes.

Referring to FIG. 8 which depicts a functional-level depiction of a generalized workspace that appears on a user's GUI, data entry in the present invention is performed through a user-friendly graphical user interface or GUI. Through the GUI, the user builds several data bases, specifically, an activity (schedule) table, a parameter table, a base table, a rank table, and an airframe table.

The activity pane holds the activities for the schedule. An activity is either a work period or a sleep period as denoted by the value of the Type column. Activities are inserted by chronological order.

The parameter table houses the different indirect parameters for a schedule. It is expected that this table will evolve over the course of the present invention's development as analysis finds that some of the parameters are inadequate and others unaccounted for are more significant.

The base table maintains a list of military bases, but could be any centralized location such as an airport, hospital, etc.

The rank table maintains a list of military ranks, but could be any other position such as manager, doctor, surgeon, air traffic controller, etc.

The airframe table maintains a list of airframes, but could be any vehicle such as a tank, submarine, carrier, etc.

The GUI workspace graphically depicts the results of the constructed database, specifically, it contains a schedule pane, a results pane having a critical effectiveness zone, and a pane each for active schedules, properties, and sleep performance.

The GUI workspace depicts an actual view specifically of a results pane indicating that on Wednesday, Jul. 27, 2007, for example, the aircrew's effectiveness is only 61%, which is equivalent to a blood alcohol content (BAC) of greater than 0.10!

The GUI provides schedule and activity data entry and display. Mission days can easily be added to the mission timeline from the GUI. Schedule and activity details can be accessed and edited. Time zones may be selected and will cause the schedule to be displayed in local time. A snapshot bar in the GUI will display critical effectiveness information at any point along the schedule timeline, including the display of critical effectiveness "zones".

The present invention's GUI is menu driven. A user may build new missions for multiple crew members or model individual crew members. Mission schedules may be saved and reopened. Data may also be imported from sources including JALIS and AviSource. Crews may be assigned to selected airframes and previous crews utilized in the same airframe are available for subsequent new mission schedule generation. Other crew members not part of a previous mission on that airframe may also be assigned when generating a mission schedule.

The present invention's GUI also allows for the entry of both work and sleep activities. Icon representing work and sleep activities are "dragged" along the displayed mission schedule timeline to the extent that work or activity comprises a corresponding amount of schedule duration. Alternatively, schedule details may be entered in tabular fashion as opposed to graphical entry. Additional mission legs may also be added through the GUI.

The present invention also accommodates the addition of "constraints". Typical constraints include (but are not limited to) adding a degree of flexibility to the beginning and ending of work activities, for example. Another example of the present invention's ability to accommodate constraints is the optimum point in the mission schedule for the application of "go pills". Jet lag effects can also be accommodated and its effect minimized within the mission schedule. Lastly, mission schedules can be shared with others by submitting e-mail addresses from within the GUI.

The present invention employs sleep modeling based on the SAFTE model/process. The first part of SAFTE involves calculating the current value of the sleep reservoir. Reservoir capacity, $R_c$, is 2880 sleep units. Performance, P, describes the reservoir depletion over time t and applies when an individual is awake. K is the slope constant for the line and is defined as 0.5 units per minute. Performance is given in Equation (1).

$$P = K * t \tag{1}$$

Additions to reservoir are described by S over time t and only apply when an individual is sleeping. It should be noted that the value of the reservoir remains fixed for the first five minutes of sleep.

$$S = SI * t \tag{2}$$

Sleep Intensity, SI, varies depending on the time of day and is the weighted sum of the sleep propensity, SP, and the sleep debt, SD.

$$SI = SP + SD \tag{3}$$

Sleep dept is given by a constant factor, f with a default value of 0.00312, multiplied by the current reservoir depletion.

$$SD = f * (R_c = R_t) \tag{4}$$

The sleep propensity incorporates a circadian component and a constant amplitude factor, $a_s$ with a default value of 0.55 units.

$$SP = -a_s * c_t \tag{5}$$

Sleep inertia describes the grogginess that one feels once awakened. Sleep inertia lasts for t from 0 to 120 minutes and is given by the following equation. $I_{max}$ has a value of 5% (note that this translates to 5, not 0.05 in implementation) and i is the inertia time constant set at 0.04.

$$I = -I_{max} * e^{-\left(i + \frac{t_g}{SI}\right)} \tag{6}$$

The circadian rhythm describes two biological rhythms which consist of different periods and are as such, are out of phase with each other. The two rhythms are the tendency to fall asleep and body temperature. The peak of the rhythm is described as p, also known as the acrophase, and the relative peak of the second rhythm is offset by p', with a default value of 3 hours. Acrophase p, has a default value of 18, or 18:00 for 6:00 pm as the peak point of alertness. Constant, β, is 0.5. The circadian equation is given below.

$$c_t = \cos\left(\frac{2\pi(T-p)}{24}\right) + \beta\cos\left(\frac{4\pi(T-p-p)}{24}\right) \tag{7}$$

Jet lag is the phenomenon where an individual's circadian rhythm is trying to catch up with a new time zone. In terms of the calculation, this is explained as a shift in acrophase p. In general, eastward travel takes 1.5 days of recovery per hour of phase shift. Westward travel takes 1.0 days of recovery per hour of phase shift. The phase is always determined when the individual goes to sleep and is based on the weighted average of the last three average awake hours. This value is combined with the relative phase, p', to determine the new goal phase. This is computed algorithmically and does not present a mathematical formula in the Warfighter Fatigue Model paper.

Finally, effectiveness is calculated for each epoch of the simulation. Effectiveness is given by the following equation.

$$E_t = 100 * \left(\frac{R_t}{R_c}\right) + C_t + I \tag{8}$$

Note that inertia I is only calculated during the first 120 minutes of wakefulness. $C_t$ is the circadian amplitude derived from the circadian process $c_t$.

$$C_t = c_t * \left(a_1 + \frac{a_2(R_c - R_t)}{R_c}\right) \tag{9}$$

In this equation, $a_1$ is set to 7%, or 7, and $a_2$ is set to 5%, or 5.

Figure 2:
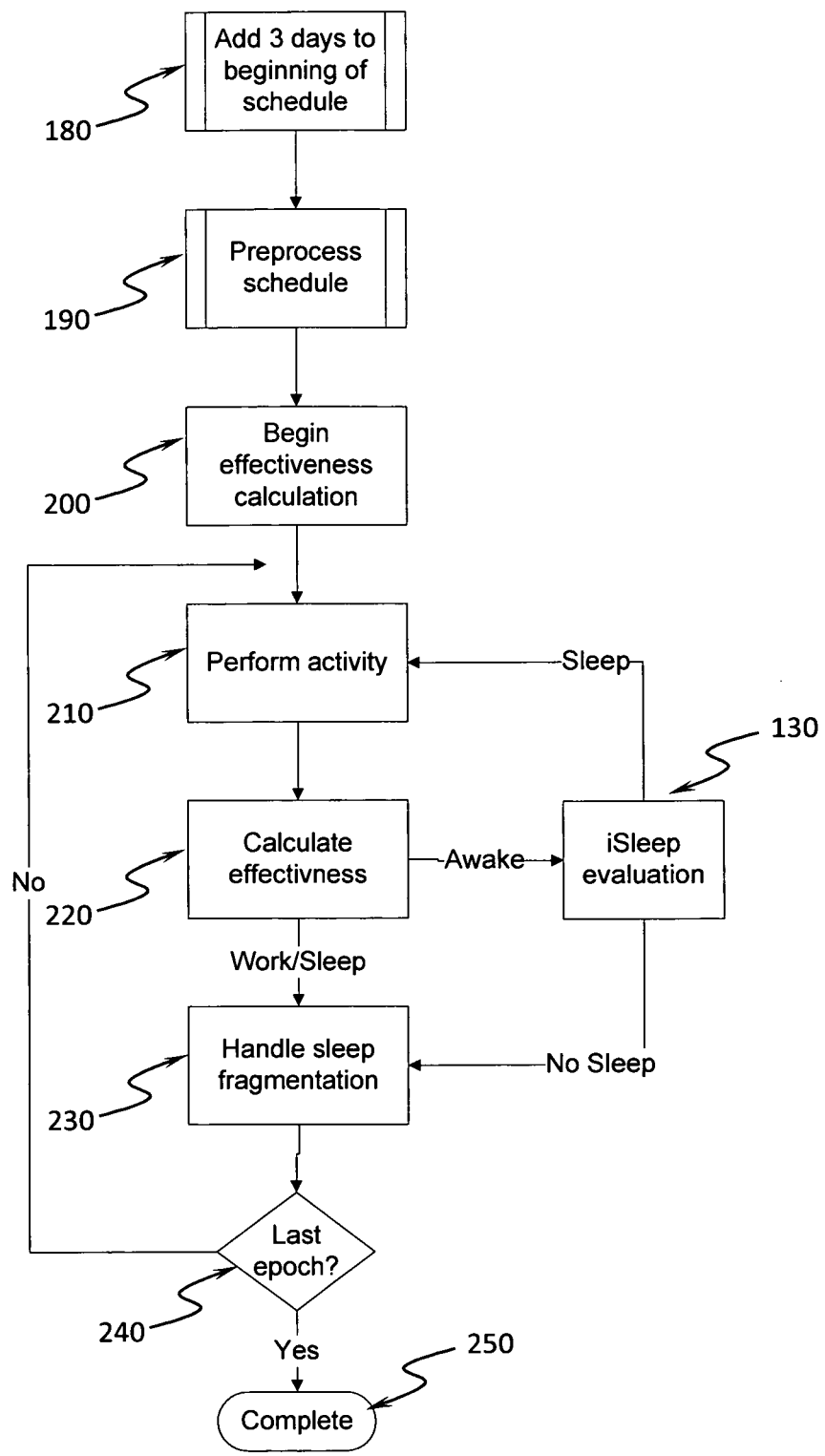
FIG. 2 depicts a flow diagram that depicts the present invention's sleep effectiveness process in conjunction with its sleep evaluation process.

Referring to FIG. 2, the implementation of the present invention inclusive of the iSleep element 130 of the present invention is best described as an iterative process that is done epoch by epoch. An epoch is simply a period of time. For purposes of performance, the present invention uses a 10 minute epoch.

The first step in calculating the schedule is to create a baseline. This is necessary so that sleep habits and acrophase can become fixed before diving into the actual schedule. At the onset of every calculation, three days are prepended 180 to midnight on the first day of the schedule.

After the schedule baseline days are added, the schedule is preprocessed 190. At this point, the schedule is broken down into an array of separate equal epochs that represent the duration of the schedule. If the schedule has one day, it will have three days prepended 180. If the epoch is one minute, this means that there are 1440 epochs per day at four days, or 5760 epochs in the collection. Because one embodiment of the present invention called FlyAwake uses a 10 minute epoch, this would total 576 epochs.

Epochs contain vital information for the calculation including the snapshot of the individual at that point in time. This includes geographic location, time zone, acrophase, goal acrophase, reservoir, effectiveness, circadian value, daytime, and whether the individual is awake, asleep, or working. The preprocessor 190 only handles the geographic location, time zone, and day time. Prior to the calculation beginning, each epoch is evaluated to determine these values. Time zone is determined by finding the geographic location in an ArcGIS Shapefile. Daytime is determined by using a sunrise/sunset calculation provided by NOAA. Geographic locations are interpreted where activity origin and destinations do not match. In the case of airplane flights, a great circle calculation is performed between the origin and destination airports. The distance at each epoch is determined by the assumed groundspeed of the aircraft using a simple d=r*t calculation, where d is distance traveled at rate r over time t.

As the iteration begins, each epoch must perform the particular activity 210. This is based upon the type of activity that is happening. If the epoch is working or awake, then the reservoir is depleted, otherwise if sleeping, the reservoir is filled. The epoch is always calculated based on the previous epoch reservoir value. If the previous epoch does not exist, i.e., this is the first epoch. It should be noted that further research has shown that the reservoir does not change within five minutes of falling asleep. The occurrence of the last epoch is continuously determined 240.

The effectiveness calculation 220 begins by determining the goal acrophase and hence any jet lag that may apply to the epoch. The goal acrophase is only reset if this is the first epoch asleep. If so, the goal acrophase is adjusted according to the weighted balance of the previous three average awake hours, where awake hour is between 0 and 24. The balance weight is 0.33, 0.66, and 1.0 respectively, giving the largest weight to the closest awake hour.

At this point, the current acrophase is then adjusted by the invention's software program as follows:

```
FUNCTION calculate_acrophase( current, goal )
    IF current < goal
        IF ABS( goal –current ) > 1 )
            IF ABS( goal –current ) > 12
                current += 24 – 2160
            ELSE
                current += 1440
            END IF
        ELSE
            current += ( goal – current ) * 2160
        END IF
```

```
    ELSE IF current > goal
        IF ABS( current – goal ) > 1
            IF ABS( current – goal ) > 12
                current –= 24 + 1440
            ELSE
                current –= 2160
            END IF
        ELSE
            current += ( goal – current ) * 1440
        END IF
    END IF
    RETURN current
END FUNCTION
```

The remainder of the effectiveness calculation 220 fills in the parameters set by the epoch as well as all of the computations associated with it. Within the first 120 minutes of wakefulness, the sleep inertia component is used. The equations above readily translate into computer software programming language.

As a final point on the effectiveness calculation implementation, after several iterations of working with the present invention's process and trying to maximize the effectiveness at 100% after 8 hours of continuous sleep from 23:00 to 07:00, it was found that a constant factor of 3.6031 had to be applied in order to get the values to rise to 100%. This contradicts the prior art Hursh paper and the prior art FAST application. In fact, in comparing values to the FAST application which is based on the same model, some modifications to the equations must be present in order to obtain the same values. Working backwards, the values from the prior art FAST application can be mathematically disproved when compared to the original equations they supposedly represent. This revelation comes as an unexpected beneficial result of the present invention and a testament to its merits.

Figure 3:
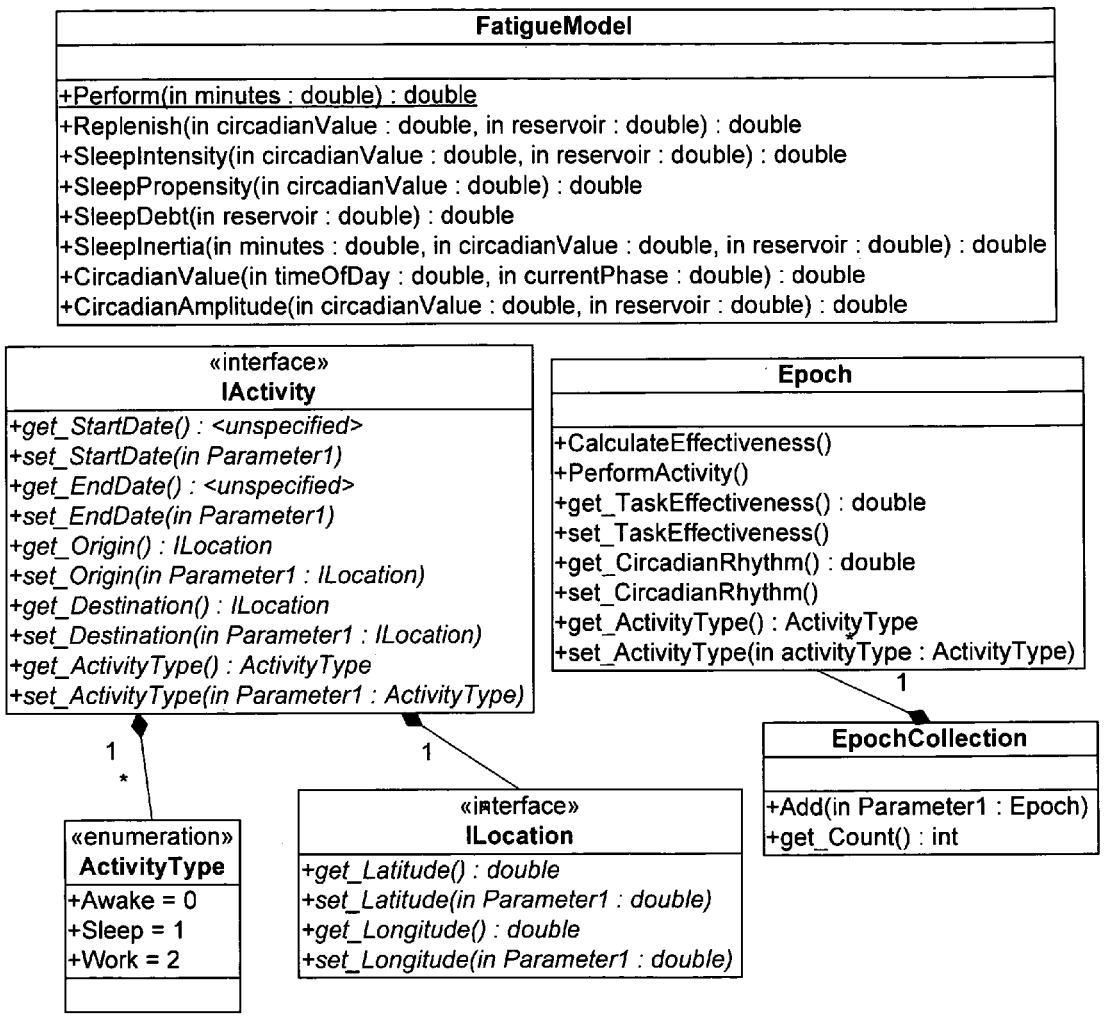
FIG. 3 depicts the UML diagram of the software model of the present invention's sleep effectiveness process.

Referring to FIG. 3 depicts a UML diagram which provides the software model for implementing the effectiveness determination step 220 depicted in FIG. 2. The actual implementation contains several overloads and additional methods, but this blueprint describes the base from which all other functionality is derived.

Figure 4:
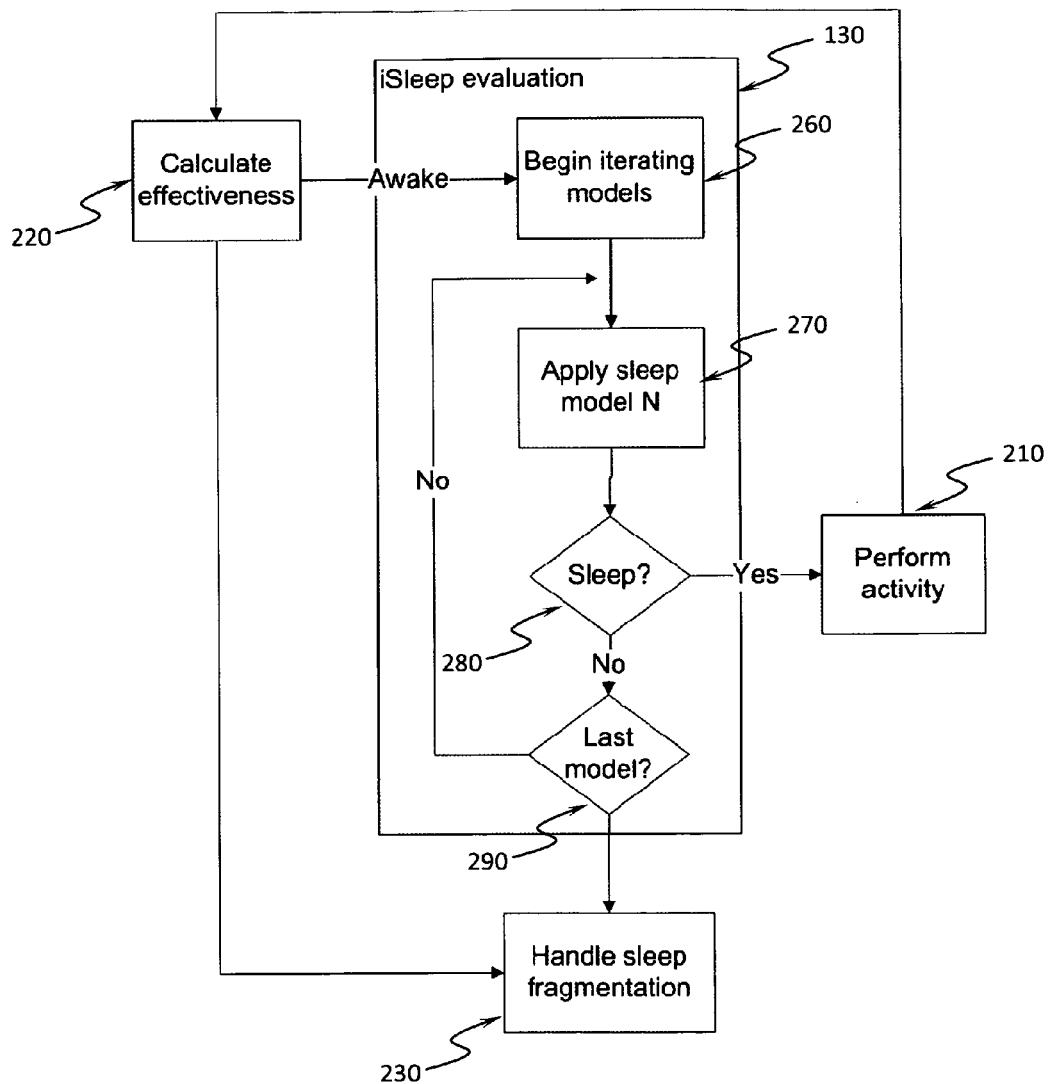
FIG. 4 depicts the present invention's sleep evaluation process comprising a sleep query engine and a sleep schedule engine.

Referring to FIG. 4, the present invention was conceived as an improvement over non-dynamic fatigue management processes, specifically, those processes which may have included several parameters to automatically insert into the schedule at fixed intervals—so long as in these prior art methods it did not interfere with work schedules. These non-dynamic fatigue management processes may have allowed for time zone shifts, but would have individuals sleep during the exact same time intervals based on geographic location. Because of this deficiency in the prior art, the present invention (i.e., iSleep) was conceived to dynamically handle sleep insertion.

The original concept for the present invention was based on Bayesian inference that would allow for N parameters to derive a Markov Chain which in turn would be statistically evaluated using Monte Carlo methods to determine sleep at a given epoch. Further, as more data was retrieved from actigraphs, this method would statistically improve at determining sleep. It was thought that using these methods, social and biological factors could be used to determine a static algorithm for sleep prediction. However, in order for that to occur, large sets of data and test subjects are required which were difficult to obtain in a non-research/non-academic environment.

Because the original concept required too much data, the present invention was modified to be as dynamic as possible and work off of two factors: social night and empirical data. It must be noted that some theoretical work is also done by making assumptions about people's sleep habits. It is extremely difficult to predict sleep, especially during social daylight hours as so many social factors vary individual sleep habits.

Social night describes actual night time at a geographic location. Because the implementation of the present invention's preprocessor can determine social night, this is advantageous to the present invention.

Empirical data was provided by Walter Reed Army Institute of Research in the form of schedules and actigraph data obtained from several flight crews. In addition to this, several schedules were obtained from various military units which provided work and sleep times in the form of Excel and Word documents. The empirical data is not used in the implementation of the static algorithm, rather it helped define the algorithm. The algorithm was originally supposed to be 80% correct in predicting sleep against the actigraph data. That is, when comparing epoch by epoch, a 20% error was allowed.

Still referring to FIG. 4, the basic concept of the present invention is to be able to introduce N smaller models 260 that can be applied 270 in different scenarios to determine if sleep is applied without having to write custom code for each different scenario. Therefore, every epoch calculation can have N sleep models applied 270 to determine if sleep is occurring 280. The occurrence of the last model is also determined 290. In conjunction with this, a smoothing algorithm is applied so that periods of sleep given by the varying models does not result in a fragmented pattern, but is continuous.

Figure 5:
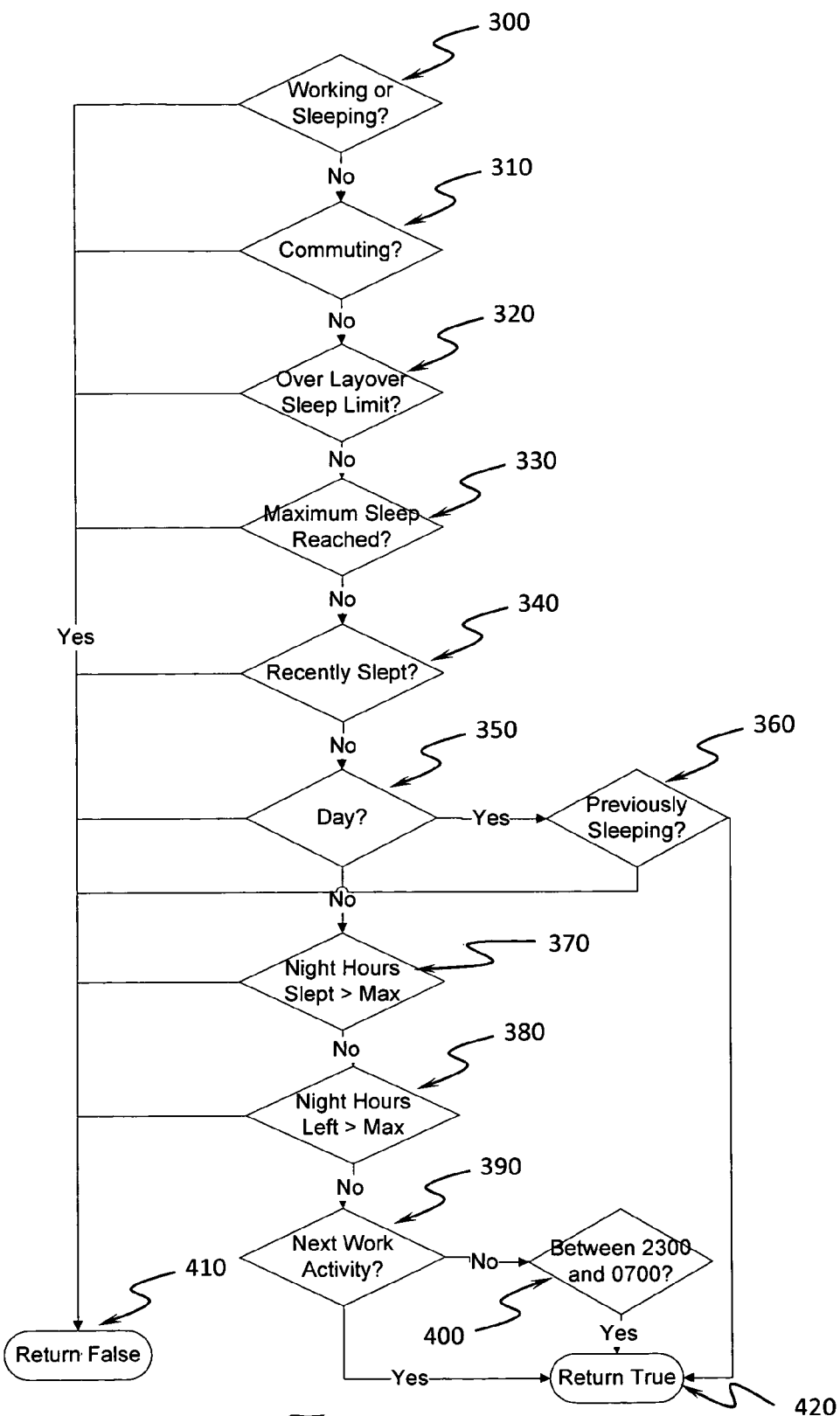
FIG. 5 depicts the flow diagram of the layover sleep model of the present invention.

Layover Sleep is the name given to the sleep model that has individuals primarily sleeping during social night hours. The concept is to maximize continuous sleep to eight hours and have them wake up as close to the commute time of their morning work schedule while going to bed eight hours prior. This model is best explained with a flowchart as shown in FIG. 5.

The present invention also includes Fossil Sleep, which is the name given to a sleep model developed by the Air National Guard to attempt to compensate for crews that complete long missions during the day time. Layover Sleep does not take this into account, so the model determines if the previous work activity was a long haul flight by determining a difference in origin and destination. If so, the effectiveness is evaluated and a determination is made that the individual would sleep for an hour at a time, up to eight hours or when the effectiveness reaches a predefined threshold. In this case, the threshold was arbitrarily selected to be 85%. Because this model can result in sleep stopping prior to social night by a small matter of hours, the iSleep fragmentation process 230 (see FIG. 4) is applied to make it one continuous resting period. The present invention's software program to implement this model is described below

```
FUNCTION is_sleep( epoch )
    IF epoch.activity_type == 'Awake' AND
    epoch.previous_work.is_flight
        IF epoch.previous_epoch.activity_type =='Sleep' AND
            epoch.cumulative_sleep < 8 AND
            epoch.previous_epoch.effectiveness < 85
                RETURN true
        END IF
    END IF
    RETURN false
END FUNCTION
``` iSleep fragmentation is the phenomenon by which multiple sleep algorithms evaluate sleep differently and the result is a choppy sleep/wake pattern that does not practically make sense. In order to combat this, the sleep must be lumped together into one fluid period followed, or preceded by the amount of an awake period (see 230, FIG. 4). The result is the same net amount of awake and sleep time, only it is grouped together in a logical place in the schedule.

Figure 6:
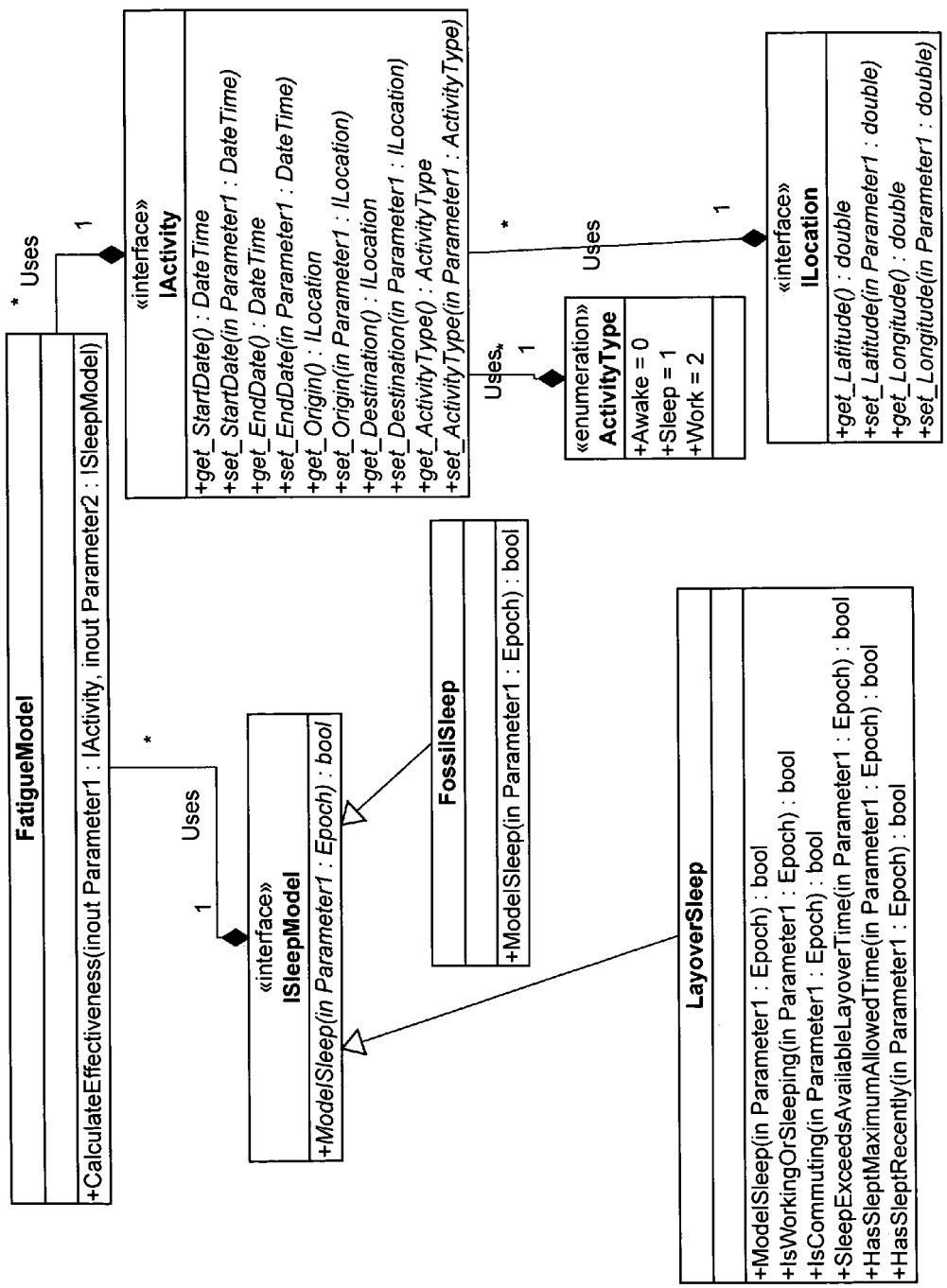
FIG. 6 depicts the UML diagram of the software model of the present invention's iSleep process.

Referring to FIG. 6, The present invention's iSleep software model is given by a UML diagram. Every model is derived from a base interface that has a single method ModelSleep(epoch:Epoch):bool. The method returns true on each epoch if sleep should occur. These are lumped together as an array and sent to the CaclulateEffectiveness(activities: List<IActivity>, sleepModels:ISleepModel[ ]) method for evaluation during the simulation. Sleep fragmentation is handled as an inline process (see 230, FIG. 4) that occurs during the simulation process and is not a separate method.

The current implementation of the present invention's fatigue calculation is sufficient for a small sample space. It works well on single individuals over a period of no longer than one month. The epoch interval severely impacts the performance of the algorithm. For instance, setting the epoch increment to one minute requires 1440 calculations for a single day. A minimum of three days is required to baseline the calculation before any schedule data is considered, therefore, 5760 calculations must be performed. To counteract this problem, the FlyAwake embodiment of the present invention set the epoch spacing at 10 minutes. This reduced the number of calculations significantly, but unfortunately does not provide the precision that may be desired over small timeframes. Regardless of changing the epoch increment, Big O analysis is O(n). This does not work well for longer schedules or multiple individuals that need to be calculated in parallel. This is also not an efficient manner for determining the average effectiveness over a period of time which is necessary for quick evaluation.

To compensate for the epoch over epoch problem, the method by which the model is simulated must change. Unfortunately, no method currently exists for calculating each individual epoch in order to graphically display the effectiveness over time, but this can be limited to what is seen on a computer screen. In order to get to that graphical starting point epoch, or to view at a very high level, new techniques must be introduced to optimize the model for several people over very long time intervals. It should be noted that the following solution runs at worse, also on O(n). However, the running time of that scenario would only occur if a different activity type (sleep, work, sleep, work, etc.) occurred every epoch.

One key feature of the present invention is to be able to determine the exact value of effectiveness E(t) for any time t without having to necessarily run through each and every epoch beforehand. Accordingly, the present invention can be run in the timeframes that define each activity, thereby giving the ability to calculate the acrophase goal $p_g$.

The key to how the present invention makes this happen is to generate a new jetlag calculation from the current acrophase calculation as a parametric formula given by Equation (10).

$$p_t = \left( p_{t_0} + \left( \frac{D*(t-t_0)}{p_g - p_{t_0}} \right) \right) \% 24 \qquad (10)$$

Constant D is either 1 day or 1.5 days determined by the direction of travel.

At this point, sufficient information is available to calculate effectiveness E(t) at any point t depending on the state of the activity, either awake or asleep. Like the previous epoch by epoch simulation, all of the previous information is needed as input to the next epoch. However, this new model is an activity by activity simulation rather than epoch by epoch.

As a result in the change of the fatigue calculation, the iSleep model must also change. However, it is based on the same principles that were introduced in Layover Sleep and Fossil Sleep embodiments of the present invention. Rather than calculating sleep at each epoch, sleep is determined up front and inserted as a block. This is far more efficient than repeating calculations over and over and can be accomplished fairly easily. In the case of the Layover Sleep embodiment of the present invention, it is important to work backwards from the next work activity to determine proper sleep insertion. The same parameters can be utilized. In the case of the Fossil Sleep embodiment, the calculation is executed in one hour intervals instead of each epoch.

In contrast, the prior art methods to date for calculating the average fatigue is to run the entire simulation, sum the effectiveness values, and divide by the interval. This is extremely inefficient and is simplified in the present invention by calculating the average across each activity and dividing by the number of activities as follows.

$$Avg(E) = \frac{\sum_{n=0}^{N} Avg(E_n)}{N} \tag{11}$$

$Avg(E_n)$ is computed separately for each activity and has a different calculation depending on the sleep/wake state of the individual. In order to quickly find the average for a particular activity, the Mean Value Theorem is utilized. In Equation (12), the average of the first 120 minutes of wakefulness is given.

$$Avg(E_n) = \frac{1}{120} \int_{t}^{t+120} 100 * (R_t/R_c) + C_t + I \, dt \tag{12}$$

This must be added to the remaining period of wakefulness (>120 minutes) which does not include sleep inertia I. The equations for awake and sleep are exactly the same except for the input to $R_t$ which varies.

$$Avg(E_n) = \frac{\int_{t_1}^{t_2} 100 * (R_t/R_c) + C_t \, dt}{t_2 - t_1} \tag{13}$$

Shift work optimization is the concept of automatically placing shift workers into shifts to minimize fatigue and maximize the average effectiveness across the entire timeframe. Big O analysis of this problem suggests that it is in the category NP-Complete problems because it is necessary to check every possible scenario before determining a solution. In computer science, this is similar to the traveling salesman problem. It is expected that this disclosed method will see many iterations of algorithmic optimizations over time, all being within the scope of the present invention. As a starting point, a base algorithm is introduced to suggest that the simplest technique to help performance is to limit the number of resources, shifts, and days that can be optimized.

To better understand the solution, it would first be useful to describe the parameters of the problem space. These include the number of days to optimize the shifts for, the number of resources available, and the number of shifts available to be worked on each day. The optimization method is explained as a series of steps: determining the resource combinations for the shifts of a particular day; determining the resource/shift combinations across all days; and evaluating the effectiveness of each combination to find the maximum. A computer code listing for optimized determination of resource combinations is as follows:

```
/// <summary>
/// Provides a set of operations for calculating combinations.
/// </summary>
/// <remarks>
public class Combination
{
    /// <summary>
    /// Chooses all combinations of the given items k at a time.
    /// </summary>
    /// <typeparam name="T">Type of item.</typeparam>
    /// <param name="items">List of items.</param>
    /// <param name="k">Number of items per combination.</param>
    /// <returns>Set of combinations.</returns>
    public static List<List<T>> Combinations<T>( List<T> items, int k )
    {
        //create the set
        List<List<T>> set = new List<List<T>>( );
        //create the combination list
        T[ ] combination = new T[k];
        //get the combinations
        GetCombinations<T>( combination, items, 1, 1, k, set );
        //return the set
        return set;
    }
    /// <summary>
    /// Recursively determines all of the combinations of a set of items.
    /// </summary>
    /// <typeparam name="T">Type of item.</typeparam>
    /// <param name="v">The current combination set.</param>
    /// <param name="items">List of items.</param>
    /// <param name="start">Starting position.</param>
```

```
/// <param name="k">Ending position.</param>
/// <param name="maxk">Number of items per combination.</param>
/// <param name="set">The growing set of combinations. This should
initially be empty as it is added to.</param>
/// <returns>True if a combination is found, otherwise false.</returns>
private static bool GetCombinations<T>( T[ ] v, List<T> items, int start,
int k, int maxk, List<List<T>> set )
{
    //if this is the end return
    if( k > maxk )
        return true;
    //otherwise, fill the list
    for( int i = start; i <= items.Count; i++ )
    {
        v[k−1] = items[i−1];
        //if a combination was complete, add it to the final set
        if( GetCombinations( v, items, i + 1, k + 1, maxk, set ) )
        {
            List<T> combination = new List<T>( v );
            set.Add( combination );
        }
    }
    //return false, no combination on this iteration
    return false;
}
/// <summary>
/// Finds all combinations, m x n, of multiple sets.
/// </summary>
/// <typeparam name="T">Type of item.</typeparam>
/// <param name="sets">Sets of items to combine.</param>
/// <returns>Set of combined items.</returns>
public static List<List<T>> AllCombinationsOf<T>( params List<T>[ ] sets )
{
    // need array bounds checking etc for production
    var combinations = new List<List<T>>( );
    // prime the data
    foreach( var value in sets[0] )
        combinations.Add( new List<T> { value } );
    foreach( var set in sets.Skip( 1 ) )
        combinations = AddExtraSet( combinations, set );
    return combinations;
}
/// <summary>
/// Adds an extra set to the combinations.
/// </summary>
/// <typeparam name="T">Type of item.</typeparam>
/// <param name="combinations">Current combinations.</param>
/// <param name="set">Set to add.</param>
/// <returns>A new set of combined items.</returns>
private static List<List<T>> AddExtraSet<T>
    ( List<List<T>> combinations, List<T> set )
{
    var newCombinations = from value in set
                          from combination in combinations
                          select new List<T>( combination ) { value };
    return newCombinations.ToList( );
}
}
```

The present invention accounts for the complexities in selecting the combinations of resources to work a shift on any given day. Each day will have its own set of shifts. As a way to account for more realistic scenarios, resources can be manually assigned to a shift or unable to work a shift on a specific day. Each shift may have a cycle (ie, three on/three off), and each shift may specify different roles (ie, 1 shift supervisor, 5 controllers). Note that different roles turn this into multidimensional combinatorics problem. Depending on the software requirements, these must all be taken into consideration in the algorithm for selecting the combinations of resources.

The combinations of resources for each role on a single shift can be determined as follows, where n is the available resources in a particular role and k is the number of that role required for shift.

$$\text{role combinations} = \prod_{role=1}^{R} \binom{n_{role}}{k_{role}}$$

The next step is to repeat that process for each shift in the single day and get the total combinations of all resources in each role on each shift.

$$\text{shift combinations} = \prod_{shift=1}^{S} \prod_{role=1}^{R} \binom{n_{role}}{k_{role}}$$

The resource/shift combinations give all of the different ways the shifts can be organized over the number of days. The process must then be repeated for as many days as the optimizer is required to run. This will result in a set of combinations for each day which must then be combined one final time before evaluating the effectiveness. The following equation gives the formula for evaluating the total number of days.

$$\text{day combinations} = \prod_{day=1}^{D} \prod_{shift=1}^{S} \prod_{role=1}^{R} \binom{n_{role}}{k_{role}}$$

To determine an optimized shift schedule, the maximum effectiveness and the resource/shift combination that created that maximum must be returned. This procedure runs through the list of combinations determined in the previous steps and selects the combination with the highest average effectiveness.

The best choice selection algorithm is the current individual who is the best choice, meaning highest effectiveness, at the given time. This does not necessarily mean that the best choice is the least disruptive choice over the entirety of the schedule. The algorithm for this runs in O(n) as each available individual must be evaluated. However, the effectiveness only needs to be evaluated to the given point in time, and not beyond. As such, a straightforward approach exists to determine the best choice as in the following computer-executable set of instructions:

```
FUNCTION best_choice( available_employees )
best_employee = null
best_value = 0
FOR i = 0 to available_employees_count
    CALL calculate_effectiveness WITH
    available_employees[i] RETURNING e
        IF best == null OR best_value < e
            best_employee = available_employees[i]
            best_value = e
        END IF
END FOR
RETURN best_employee
END FUNCTION
```

What is claimed is:

1. An apparatus for risk identification and mitigation in shift work and analyzing and modeling shift worker fatigue, comprising:
    a computer Graphical User Interface (GUI);
    a software program comprising computer-executable instructions stored on a non-transitory computer readable storage medium, wherein said software program, when executed, causes said computer Graphical User Interface (GUI) to generate
        resource combinations for a plurality of shifts in a particular workday;
        resource and shift combinations across all said workdays;
        a maximum effectiveness of each of said shift combinations so as to determine an optimum combination;
        a user interface for generating a work schedule;
        a schedule preprocessor for producing direct parameters from said work schedule;
        a sleep database containing work and sleep information;
        a sleep engine for inserting sleep into said work schedule by breaking down said direct parameters by work segments in cooperation with said sleep database; and
        a sleep modeler for outputting work and sleep effectiveness results from said work segments;
        database building responsive to data entry;
        timezone selection options; and
        data display for displaying results;
            wherein said generation of database building responsive to database entry further comprises generation of
                a schedule;
                a parameter table;
                a base table;
                a rank table; and
                an airframe table; wherein
                    said schedule comprises work and sleep activities in chronological order;
                    said parameter table comprises direct and indirect parameters for a particular schedule;
                    said base table comprises a list of military bases, airports, hospitals and points of interest;
                    said rank table comprises a list of individuals and their military rank; and
                    said airframe table comprises a list of ground, air and sea vehicle type.

2. The apparatus of claim 1, wherein said data display for displaying results further comprises a constructed database, wherein said constructed database further comprises
    a schedule pane;
    a results pane capable of identifying a critical effectiveness zone;
    an active schedule pane;
    a properties pane; and
    a sleep performance pane.

3. The apparatus of claim 1, wherein said indirect parameters comprise data on
    crew age and gender;
    sleeping aids; and
    stimulants.

4. The apparatus of claim 1, wherein said direct parameters comprise data on
    circadian value;
    effectiveness;
    daylight;
    time of day;
    geographic location;
    day of the week;
    timezones crossed;
    jet lag; and
    season.

5. The apparatus of claim 1, wherein said software program further causes said computer Graphical User Interface (GUI) to
    create a schedule baseline;
    prepend a plurality of days to said schedule baseline;
    preprocess said schedule into a plurality of epochs of a specified temporal value, wherein said plurality of epochs, when added, are equivalent to the duration of said schedule;
    determine for each of said epoch geographic location; time zone; acrophase; goal acrophase; reservoir; effectiveness; circadian value; daytime; and the wake, sleep, or working status of crew member being analyzed and modeled; perform an activity for the duration of each of said epoch;

deplete said reservoir for wake and working status of said crew member;
add to said reservoir for sleeping status of said crew member;
determine effectiveness for each of said epoch;
evaluate sleep for each of said epoch;
determine whether current epoch is the last epoch; and
return to said step of performing an activity for the duration of each said epoch until last epoch is reached.

6. The apparatus of claim 5 wherein said determining said goal acrophase further comprises resetting said goal acrophase if said activity during first said epoch is sleep.

7. The apparatus of claim 5 wherein determining said goal acrophase further comprises adjusting said goal acrophase according to a weighted balance of the previous three average awake hours.

8. The apparatus of claim 5 wherein said evaluating sleep for each of said epoch further comprises modeling said sleep in said sleep engine, wherein said modeling further comprises:
applying a plurality of sleep models to each of said epochs;
determining whether sleep is occurring;
authorizing an activity to be performed when sleep is occurring;
calculating effectiveness;
smoothing the effect of said plurality of sleep models; and
determining when a last sleep model of said plurality of sleep models has been applied.

9. The apparatus of claim 8 wherein said sleep engine for inserting sleep into said work schedule
determines whether crew is working or sleeping during said epoch and returns a false result when working;
determines whether crew is commuting during said epoch and returns a false result when commuting;
determines whether crew has exceeded its layover sleep limit during said epoch and returns a false result when having exceeded said limit;
determines whether crew has attained a maximum sleep limit during said epoch and returns a false result when said limit is attained;
determines whether crew has recently slept during said epoch and returns a false result when crew has recently slept;
determines whether it is daytime during said epoch and further determines whether crew was previously sleeping and;
returns a false result when it is not daytime;
returns a false result when it is daytime and crew was not previously sleeping;
returns a true result when it is daytime and crew was previously sleeping;
determines whether the available hours of night time exceed a maximum and returns a false result when the available hours of night time exceed said maximum; and
determines whether the next activity is a work activity;
returns a true result when said next activity is a work activity;
determines whether the local time is between 2300 hours and 0700 hours; and
returns a true result when said local time is between 2300 hours and 0700 hours.

10. The apparatus of claim 8 wherein said effectiveness further comprises an average effectiveness across each said activity and divided by the number of activities according to the expression $$Avg(E) = \frac{\sum_{n=0}^{N} Avg(E_n)}{N}$$

wherein
Avg(E) is the average effectiveness value;
N is the number of activities; and
$Avg(E_n)$ is the average effectiveness value computed separately for each activity.

11. The apparatus of claim 10 wherein said effectiveness further comprises an average effectiveness during the first 120 minutes of wakefulness, taking into account the effects of sleep inertia, according to the expression $$Avg(E_n) = \frac{1}{120} \int_{t}^{t+120} 100 * (R_t/R_c) + C_t + I\, dt$$

wherein
$Avg(E_n)$ is the average effectiveness value;
$R_t$ is the amount of reservoir depleted at a given time t;
$R_C$ is the reservoir capacity;
I is sleep inertia;
$C_t$ is the circadian amplitude;
dt is a derivative with respect to time; and
t is the time.

12. The apparatus of claim 11 wherein said effectiveness further comprises the addition of said average effectiveness during the first 120 minutes of wakefulness, taking into account the effects of sleep inertia, to an average effectiveness during the period beyond the first 120 minutes of wakefulness in the absence of sleep inertia, the latter given by the expression $$Avg(E_n) = \frac{\int_{t_1}^{t_2} 100 * (R_t/R_c) + C_t\, dt}{t_2 - t_1}$$

wherein
$t_2 - t_1$ is the period of time beyond the first 120 minutes of wakefulness; and
dt is a derivative with respect to time.

13. The apparatus of claim 1, wherein said generation of resource combinations for a plurality of shift worker shifts in a particular workday further comprises the addition of a new shift in said user interface;
selection of a recurrence of said new shift where said recurrence is one selection from the group consisting of daily, weekly or variable recurrence;
addition of types of positions to said new shift; specification of manning ratios among said types of positions;
display, in said user interface, of said shifts, said resource combinations, and a minimum and maximum effectiveness of any said shift worker over the duration of any of said plurality of shifts and for any said shift position; and
specification of a high effectiveness and a critical effectiveness range.

14. The apparatus of claim 13 wherein said resource combinations for a plurality of shift worker shifts in a particular workday further comprises combinations of resources for each said shift position defined by:

$$\text{role combinations} = \prod_{role=1}^{R} \binom{n_{role}}{k_{role}}$$

wherein,
n=the available resources for a particular shift position;
k=the number of shift positions required for a particular shift, and wherein a role is equivalent to a shift position; and
R=roles.

15. The apparatus of claim 14 wherein said resource combinations for a plurality of shift worker shifts in a particular workday further comprises a total combination of all said resources for each said shift position for a particular workday defined by:

$$\text{shift combinations} = \prod_{shift=1}^{S} \prod_{role=1}^{R} \binom{n_{role}}{k_{role}}$$

wherein,
n=the available resources for a particular shift position;
k=the number of shift positions required for a particular shift, and wherein a role is equivalent to a shift position;
R=roles;
S=shifts; and
a role is equivalent to a shift position.

16. The apparatus of claim 15 wherein resource combinations for a plurality of shift worker shifts in a particular workday further comprises the number of ways said resource and said shift combinations can be organized over a plurality of workdays defined by:

$$\text{day combinations} = \prod_{day=1}^{D} \prod_{shift=1}^{S} \prod_{role=1}^{R} \binom{n_{role}}{k_{role}}$$

wherein,
n=the available resources for a particular shift position;
k=the number of shift positions required for a particular shift, and wherein a role is equivalent to a shift position;
R=roles;
S=shifts;
D=days; and
a role is equivalent to a shift position.

17. A software program for risk identification and mitigation of shift work fatigue, said software program comprising a series of computer-executable steps stored on a non-transitory medium which, when executed by said computer, cause said computer to
determine resource combinations for a plurality of shifts in a particular workday;
determine resource and shift combinations across all said workdays;
determine a maximum effectiveness of each of said shift combinations so as to determine an optimum combination;
generate a work schedule;
preprocess said work schedule so as to produce direct parameters from said work schedule;
build a sleep database containing work and sleep information;
insert sleep into said work schedule by breaking down said direct parameters by work segments in cooperation with said sleep database; and
output work and sleep effectiveness results from said work segments using a sleep model; wherein said software program step of building a sleep data base further comprises causing said computer to create
a schedule;
a parameter table;
a base table;
a rank table; and
an airframe table;
wherein said schedule comprises work and sleep activities in chronological order; said parameter table comprises direct and indirect parameters for a particular schedule;
said base table comprises a list of military bases, airports, hospitals and points of interest;
said rank table comprises a list of individuals and their military rank;
said airframe table comprises a list of ground, air and sea vehicle type; and
a display of the results of said sleep database according to schedule, wherein said results are capable of identifying a critical effectiveness zone, active schedule, properties, and sleep performance.

18. The software program of claim 17, wherein said indirect parameters comprise data on
crew age and gender;
sleeping aids; and
stimulants.

19. The software program of claim 17, wherein said direct parameters comprise data on
circadian value;
effectiveness;
daylight;
time of day;
geographic location;
day of the week;
timezones crossed;
jet lag; and
season.

20. The software program of claim 17, wherein said computer-executable instructions further cause said computer to
create a schedule baseline;
prepend a plurality of days to said schedule baseline;
preprocess said schedule into a plurality of epochs of a specified temporal value, wherein said plurality of epochs, when added, are equivalent to the duration of said schedule;
determine for each of said epoch geographic location, time zone, acrophase, goal acrophase, reservoir, effectiveness, circadian value, daytime, and the wake, sleep, or working status of crew member being analyzed and modeled;
perform an activity for the duration of each of said epoch;
deplete said reservoir for wake and working status of said crew member;
add to said reservoir for sleeping status of said crew member;
determine effectiveness for each of said epoch;
evaluate sleep for each of said epoch;
determine whether current epoch is the last epoch; and
return to said step of performing an activity for the duration of each said epoch until last epoch is reached.

21. The software program of claim 20 wherein said determination of said goal acrophase further comprises resetting said goal acrophase if said activity during first said epoch is sleep.

22. The software program of claim 20 wherein said determination of said goal acrophase further comprises adjusting said goal acrophase according to a weighted balance of the previous three average awake hours.

23. The software program of claim 20 wherein said evaluation of sleep for each of said epoch further comprises modeling said sleep in said sleep engine, wherein said modeling further causes said computer to:
- apply a plurality of sleep models to each of said epochs;
- determine whether sleep is occurring;
- authorize an activity to be performed when sleep is occurring;
- calculate effectiveness;
- smooth the effect of said plurality of sleep models; and
- determine when a last sleep model of said plurality of sleep models has been applied.

24. The method of claim 23 wherein said insertion of sleep into said work schedule further causes said computer to
- determine whether crew is working or sleeping during said epoch and return a false result when working;
- determine whether crew is commuting during said epoch and return a false result when commuting;
- determine whether crew has exceeded its layover sleep limit during said epoch and return a false result when having exceeded said limit;
- determine whether crew has attained a maximum sleep limit during said epoch and return a false result when said limit is attained;
- determine whether crew has recently slept during said epoch and return a false result when crew has recently slept;
- determine whether it is daytime during said epoch and further determine whether crew was previously sleeping and;
- return a false result when it is not daytime;
- return a false result when it is daytime and crew was not previously sleeping;
- return a true result when it is daytime and crew was previously sleeping;
- determine whether the available hours of night time exceed a maximum and return a false
- result when the available hours of night time exceed said maximum; and
- determine whether the next activity is a work activity;
- return a true result when said next activity is a work activity;
- determine whether the local time is between 2300 hours and 0700 hours;
- return a true result when said local time is between 2300 hours and 0700 hours.

25. The software program of claim 23 wherein said effectiveness calculation further causes said computer to calculate an average effectiveness across each said activity and dividing by the number of activities according to the expression $$Avg(E) = \frac{\sum_{n=0}^{N} Avg(E_n)}{N}$$

wherein
- $Avg(E)$ is the average effectiveness value;
- $N$ is the number of activities; and
- $Avg(E_n)$ is the average effectiveness value computed separately for each activity.

26. The software program of claim 25 wherein said step of effectiveness calculation further causes said computer to calculate an average effectiveness during the first 120 minutes of wakefulness, taking into account the effects of sleep inertia, according to the expression $$Avg(E_n) = \frac{1}{120}\int_{t}^{t+120} 100*(R_t/R_c) + C_t + I\, dt$$

wherein
- $Avg(E_n)$ is the average effectiveness value;
- $R_t$ is the amount of reservoir depleted at a given time t;
- $R_C$ is the reservoir capacity;
- I is sleep inertia;
- $C_t$ is the circadian amplitude;
- dt is a derivative with respect to time; and
- t is the time.

27. The software program of claim 26 wherein said effectiveness calculation further causes said computer to add said average effectiveness during the first 120 minutes of wakefulness, taking into account the effects of sleep inertia, to an average effectiveness during the period beyond the first 120 minutes of wakefulness in the absence of sleep inertia, the latter given by calculating the expression $$Avg(E_n) = \frac{\int_{t_2}^{t_2} 100*\left(\frac{R_t}{R_c}\right) + C_t dt}{t_2 - t_1}$$

wherein
- $t_2-t_1$ is the period of time beyond the first 120 minutes of wakefulness; and
- dt is a derivative with respect to time.

28. The software program of claim 17, wherein said determination of resource combinations for a plurality of shift worker shifts in a particular workday further causes said computer to
- add a new shift in said user interface;
- select a recurrence of said new shift where said recurrence is one selection from the group consisting of daily, weekly or variable recurrence;
- add types of positions to said new shift;
- specify manning ratios among said types of positions;
- display, in said user interface, said shifts, said resource combinations, and a minimum and maximum effectiveness of any said shift worker over the duration of any of said plurality of shifts and for any said shift position; and
- specify a high effectiveness and a critical effectiveness range.

29. The software program claim 28 wherein said determination of resource combinations for a plurality of shift worker shifts in a particular workday further causes said computer to determine combinations of resources for each said shift position according to:

$$\text{role combinations} = \prod_{role=1}^{R} \binom{n_{role}}{k_{role}}$$

wherein,
- n=the available resources for a particular shift position;
- k=the number of shift positions required for a particular shift, and wherein a role is equivalent to a shift position; and
- R=roles.

30. The software program of claim 29 wherein said determination of resource combinations for a plurality of shift worker shifts in a particular workday further causes said computer to determine a total combination of all said resources for each said shift position for a particular workday according to:

$$\text{shift combinations} = \prod_{shift=1}^{S} \prod_{role=1}^{R} \binom{n_{role}}{k_{role}}$$

wherein,
n=the available resources for a particular shift position;
k=the number of shift positions required for a particular shift, and wherein a role is equivalent to a shift position;
R=roles;
S=shifts; and
a role is equivalent to a shift position.

31. The software program of claim 30 wherein said determination of resource combinations for a plurality of shift worker shifts in a particular workday further causes said computer to determine the number of ways said resource and said shift combinations can be organized over a plurality of workdays according to:

$$\text{day combinations} = \prod_{day=1}^{D} \prod_{shift=1}^{S} \prod_{role=1}^{R} \binom{n_{role}}{k_{role}}$$

wherein,
n=the available resources for a particular shift position;
k=the number of shift positions required for a particular shift, and wherein a role is equivalent to a shift position;
R=roles;
S=shifts;
D=days; and
a role is equivalent to a shift position.

* * * * *